May 12, 1936. E. S. FREED 2,040,548
TREATMENT OF NITRATE BEARING MATERIAL
Filed Dec. 29, 1933
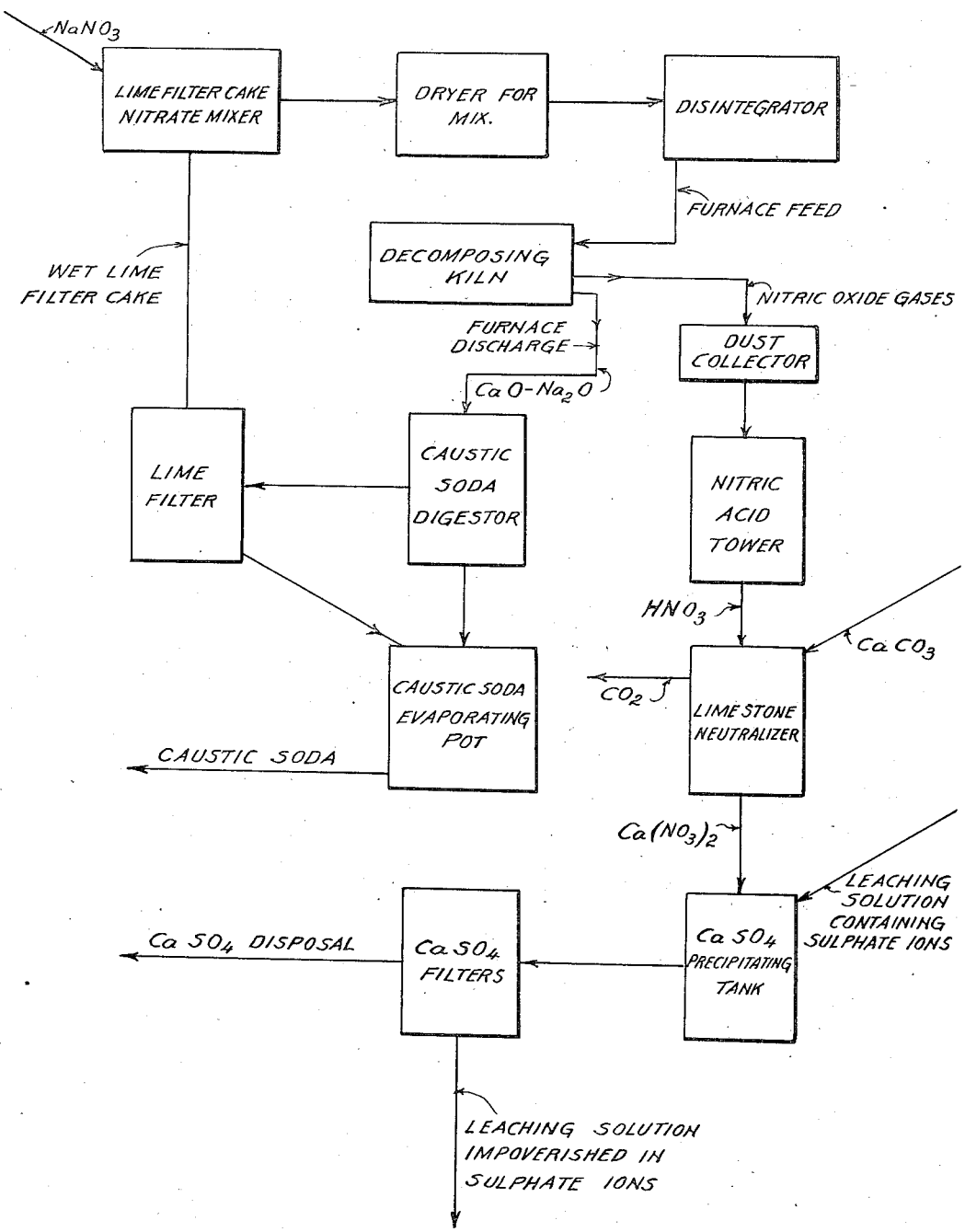
INVENTOR
EDGAR STANLEY FREED
BY
Pennie, Davis, Marvin & Edmonds
ATTORNEYS Patented May 12, 1936

2,040,548

UNITED STATES PATENT OFFICE 2,040,548

TREATMENT OF NITRATE-BEARING MATERIAL

Edgar Stanley Freed, Norfolk, Va., assignor to Compania Salitrera Anglo Chilena (Anglo Chilean Nitrate Corporation), a corporation of Chile Application December 29, 1933, Serial No. 704,409

1 Claim. (Cl. 23—38)

This invention relates to the treatment of nitrate-bearing material, and in particular to the treatment of sodium nitrate bearing material containing sulphates of potassium and/or magnesium in the form of double salts. The invention also relates to the treatment of other materials containing double salts of potassium and/or magnesium sulphates. The invention aims, generally, to improve the extraction and recovery of commercially valuable products from such materials.

The invention is particularly applicable to the treatment of sodium nitrate in its naturally occurring forms, such for example as caliche. It is customary to extract sodium nitrate from such material by an aqueous leaching liquor, as for example by the method disclosed in the United States patent of Burdick No. 1,517,046, dated November 5, 1924. In addition to sodium nitrate, caliche contains other valuable salts such as potassium and magnesium salts. A study of the physical chemistry of these potassium and magnesium salts shows that for the most part they exist in caliche in the form of double salts, particularly as sulphates in combination with calcium sulphate. Polyhalite ($MgSO_4 \cdot K_2SO_4 \cdot 2CaSO_4 \cdot H_2O$) is an example of one of several such double salts commonly present in caliche. These double salts are practically insoluble in the customary nitrate leaching liquors, and in the present practices are discarded with the waste solid residues known as "ripio".

In the leaching of caliche, and similar nitrate bearing materials, it is the general practice to circulate the leaching solution (mother liquor) between the leaching stage and the nitrate-recovery stage of the plant. The leaching liquor is generally so saturated in sulphate ions that practically no potassium sulphate or magnesium sulphate is dissolved from double salts thereof during the leaching of the caliche. The present invention, in one of its aspects, contemplates a removal of sulphate ions from the leaching liquor in sufficient amount to permit the solution, during leaching of the caliche, of substantial amounts of potassium and magnesium sulphates from double salts. Thus, the leaching solution or mother liquor, returning from the nitrate recovery stage to the leaching stage, is treated with calcium nitrate thereby precipitating calcium sulphate, and the so-treated leaching liquor, thus impoverished in sulphate ions, is utilized in the leaching of caliche. Preferably, the calcium nitrate is produced by heating or calcining sodium nitrate and an appropriate decomposing agent (such as lime) with the evolution of oxides of nitrogen, which are caused to react, in any appropriate manner, with lime to form calcium nitrate. The solid reaction product of the calcining operation contains sodium oxide which is recovered by leaching, and appropriately concentrated as marketable caustic soda.

In carrying out the invention, in its complete aspect, nitrate-bearing material containing double salts of potassium sulphate, or magnesium sulphate, or both, is leached with mother liquor sufficiently impoverished in sulphate ions to dissolve substantial amounts of the potassium and magnesium sulphates from the double salts thereof present in the caliche. This impoverishment of the mother liquor in sulphate ions is preferably brought about by treating the mother liquor with an alkaline earth metal nitrate such as calcium nitrate. Calcium nitrate, for this purpose, may be conveniently formed by calcining sodium nitrate in the presence of a water-insoluble compound (such as lime) adapted to promote the decomposition of sodium nitrate into gaseous oxides of nitrogen and a solid residue containing sodium oxide. The gaseous oxides of nitrogen are appropriately treated with lime or limestone to form calcium nitrate, while the solid residue is leached with water, and caustic soda is recovered from the resulting solution, and the lime (or the like) is regenerated from the insoluble residue.

The invention will be better understood from the following description taken in conjunction with the single figure of the accompanying drawing which is a diagrammatic flow sheet of a plant for practicing the invention in its complete and now preferred aspect. It is to be understood that this description and the accompanying drawing are merely illustrative and in no sense restrictive, since the invention may be practiced in various other ways.

Sodium nitrate is heated with an appropriate reagent, such as lime, calcium carbonate or ferric oxide, at temperatures, say from 500 to 900° C., causing the sodium nitrate to decompose into its components, sodium oxide and oxides of nitrogen (nitric oxide gases). This heat treatment may take place in any appropriate type of kiln or furnace. The resulting sodium oxide may or may not be combined with the decomposing reagent, but when the furnace product is digested with water there results a solution of caustic soda and a regeneration of the decomposing reagent. The caustic soda solution is separated from the regenerated decomposing reagent by filtration, sedimentation, or other appropriate means, and evaporated to a concentrated or solid marketable caustic soda.

The regenerated lime (or other appropriate decomposing reagent), after filtration or other suitable dehydrating treatment, is mixed with fresh sodium nitrate, and the mixture dried, disintegrated and fed to the decomposing furnace or kiln.

The oxides of nitrogen liberated and evolved in the decomposing kiln are passed through an appropriate dust collector and may be collected and absorbed in water to form nitric acid, as for example in a nitric acid tower. The nitric acid is treated with lime or limestone to produce calcium nitrate. If desired, calcium nitrate may be formed by the direct passage of the oxides of nitrogen over limestone under suitable conditions of temperature and oxidation.

The calcium nitrate so produced is used to remove sulphate ions (as calcium sulphate) from sodium nitrate leaching solutions, such as the mother liquor returning from the nitrate recovery stage to the caliche-leaching stage. The mother liquor may contain 50 to 60 grams per liter of sulphate ions expressed as sodium sulphate. When treated with calcium nitrate, in accordance with the invention, the sulphate ions in the liquor are removed (as calcium sulphate), and the liquor, being now impoverished in sulphate ions, can dissolve sulphate from the double salts of potassium and magnesium present in the caliche. In other words, the potassium sulphate and magnesium sulphate in polyhalite are insoluble in leaching solutions containing 50 to 60 grams per liter of sodium sulphate, but when sulphate ions are removed from such leaching solutions with calcium nitrate, new sulphate ions go into solution because the solution is now capable of dissolving magnesium and potassium sulphates from the insoluble calcium sulphate in polyhalite.

Nitrate leaching solutions commonly contain large amounts of sodium chloride and sodium sulphate extracted from the caliche or the like. In treating the leaching solution with calcium nitrate, there is a solution of nitrate ions, thereby regenerating the sodium nitrate originally used in the decomposing furnace.

The invention may be practiced either for rendering the relatively insoluble double salts of potasium and magnesium in caliche available for ultimate recovery with caustic soda as a valuable by-product, or for making caustic soda from sodium nitrate without the disadvantage of having to find a market or otherwise unprofitably disposing of the nitric acid or calcium nitrate.

Thus, the sodium and nitrate content of the sodium nitrate are separately recovered from the decomposing kiln, and the valuable nitrate content of the calcium nitrate used in treating the mother liquor remains in solution in that liquor. The only necessary additional raw material used in practicing the invention is the lime or limestone consumed in producing the calcium nitrate. The invention, at the expense of this relatively cheap lime or limestone, enables the recovery from the caliche of substantial amounts of potassium and magnesium salts.

While I have herein particularly described the invention as applied to the natural nitrate industry, it is to be understood that the invention is equally applicable to the recovery of potassium or magnesium salts or both from polyhalite, and similar double salts thereof, known to exist in large deposits in various parts of the world, particularly in Texas. By using a cheap sodium salt, such as sodium chloride, in connection with the leaching of polyhalite, or the like, the potassium and magnesium are recovered as chlorides, and the sodium in the sodium chloride is converted to caustic soda. The nitrate ($NO_3$) may be used over and over again. The net result of such an operation may be expressed by the following equation:

$$4NaCl + 2CaCO_3 + K_2SO_4 \cdot MgSO_4 \cdot 2CaSO_4 + 2H_2O = 4NaOH + 2KCl + MgCl_2 + 4CaSO_4 + 2CO_2$$

While I prefer to use calcium nitrate for precipitating sulphate ions from the leaching solution, it will be understood that other alkaline earth metal nitrates may be used when economically available.

I claim:

In a process for treating sodium nitrate-bearing material containing sulphate of potassium or sulphate of magnesium or both in the form of a double salt involving leaching of the material with an aqueous liquor to form a sodium nitrate solution, separation of dissolved sodium nitrate from the solution, and re-use of the mother liquor, after separation of sodium nitrate, in the leaching operation, the improvement which comprises treating the mother liquor with calcium nitrate to effect the precipitation of sulphate ions contained therein in the form of calcium sulphate, thereby to increase the capacity of the mother liquor for dissolving sulphates during the leaching operation and to provide for the recovery of potassium or magnesium or both in the form of nitrate.

EDGAR STANLEY FREED.